United States Patent

[11] 3,524,412

| [72] | Inventor | James D. Wilson |
| --- | --- | --- |
| | | Long Beach, California |
| [21] | Appl. No. | 776,739 |
| [22] | Filed | Nov. 18, 1968 |
| | | Continuation-in-part of Ser. No. |
| | | 747,231, July 24, 1968, now abandoned. |
| [45] | Patented | Aug. 18, 1970 |
| [73] | Assignee | Banner Metals, Inc., |
| | | Compton, California |
| | | a Corp. of Ohio |

[54] INCLINED RAMP WHICH ENABLES A WHEELED BASE TO TRAVERSE THERE ALONG IN A HORIZONTAL POSITION
5 Claims, 4 Drawing Figs.

[52] U.S. Cl. .................................................... 104/134,
193/38, 193/41, 214/85, 214/515, 296/61
[51] Int. Cl. .................................................... B65g 11/02
[50] Field of Search .......................................... 104/134;
193/38, 41; 214/85, 99, 334, 505, 515, 517; 14/71;
108/55; 296/61

[56] References Cited
UNITED STATES PATENTS

| 1,673,740 | 6/1928 | Eide | 214/85X |
| --- | --- | --- | --- |
| 2,705,081 | 3/1955 | Jacobs | 193/41X |
| 2,989,163 | 6/1961 | O'Donnell | 214/85X |
| 3,369,684 | 2/1968 | Ford | 214/515 |

*Primary Examiner*— Joseph R. Leclair
*Assistant Examiner*— Steven E. Lipman
*Attorney*—Jessup and Beecher

ABSTRACT: A ramp is provided for unloading dolly-supported or rack-supported receptacles from a truck, or for loading the same. The dollies and racks with which the ramp of the invention is intended to be utilized normally support their receptacles in a vertical tiered position. The ramp of the invention enables the dolly or rack to be loaded onto the truck, or unloaded, in a manner such that the receptacles are supported in a generally horizontal position when so loaded, one on top of the other in a vertical tier. In this way, there is no tendency for the tier of receptacles to tilt or fall over while it is being loaded into the truck or unloaded from the truck on the ramp of the invention.

Patented Aug. 18, 1970 3,524,412
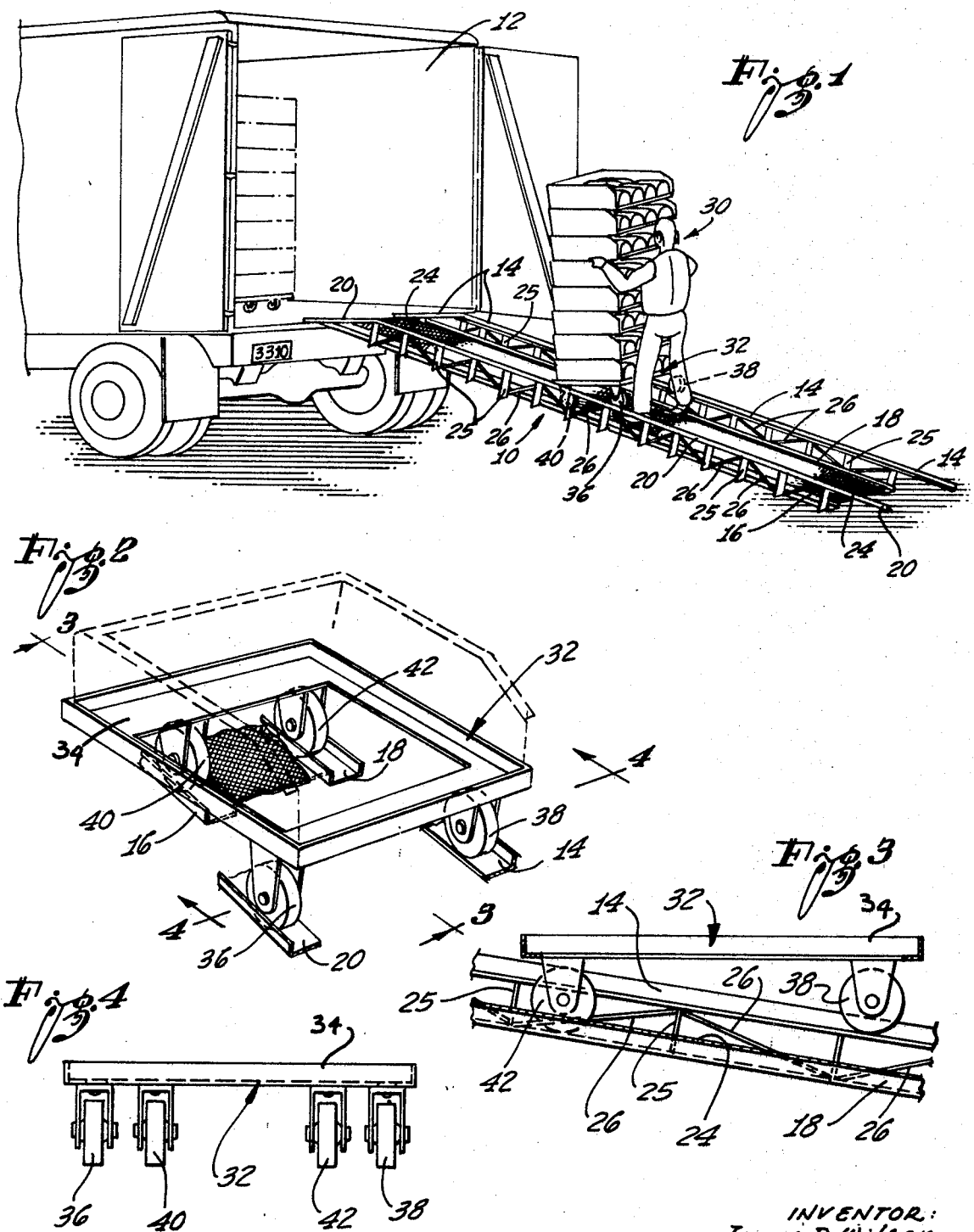
INVENTOR:
James D. Wilson
By Keith D. Beecher
ATTORNEYS 3,524,412

INCLINED RAMP WHICH ENABLES A WHEELED BASE TO TRAVERSE THERE ALONG IN A HORIZONTAL POSITION

BACKGROUND OF THE INVENTION

This application is a continuation-in-part of Copending Application Serial No. 747,231, filed July 24, 1968, now abandoned.

It is usual to support stacks of receptacles on dollies in a supermarket, or the like, for example, to display bakery goods, such as bread, cake, rolls, and the like. It is usual to load the dollies at the bakery, each with a stack of receptacles containing the bread or other bakery products. The loaded receptacles and dollies are then transported to the supermarkets, usually by truck.

It is often necessary to load the dollies onto the truck or unload them from the truck without the use of either a raised dock or an elevator type tail gate. The ramp of the present invention is particularly suited for such a purpose. A feature of the ramp of the invention is that it is readily portable, and can be carried by the truck conveniently stowed under the truck body, for example, when the ramp is not in use.

The ramp of the invention, as will be described, permits the dollies to be loaded onto the trucks, or unloaded therefrom, with the receptacles of the stacks held by the dollies disposed in vertical tiered position, so that there is no tendency for the stacks to fall over.

The ramp of the invention also has utility for loading racks onto a truck, or for unloading the racks from a truck, without any tendency for the contents thereof to spill out. Such racks, for example, support a tier of trays in normally horizontal positions for access of the merchandise held in the trays. With the ramp of the invention, the trays assume horizontal positions when loaded onto the truck, or unloaded therefrom, so that there is no tendency for them or the contents thereof to fall out of the racks.

SUMMARY OF THE INVENTION

The ramp of the invention, as will be described, provides two outer channels and two inner channels for the wheels or casters of the aforesaid dollies, or of the bases of the aforesaid racks. One pair of channels of the ramp is inset with respect to the other pair, and the outer channels are elevated above the inner channels. Therefore, the ramp of the invention effectively provides two inclined planes, one above the other, of two channels each.

The rear casters of the dolly or rack base are spaced apart a particular distance so that they engage the inner, lower channels of the ramp; and the front casters of the dolly are spaced further apart so that they engage the outer, upper channels thereof. Therefore, the wider spaced front casters are guided by the outer upper pairs of spaced channels; whereas the narrower spaced rear casters are guided by the inner lower pair of spaced channels.

With such an engagement of the dolly or rack base with the ramp of the invention, the receptacles supported by the dolly are individually disposed in horizontal planes positioned vertically one above the other, and the trays supported in the corresponding rack are likewise disposed in horizontal planes, so that there is no tendency for the loads to spill over.

BRIEF DESCRIPTION OF THE DRAWING

FIGURE 1 is a perspective representation showing a ramp constructed in accordance with one embodiment of the invention in position against the rear end of a truck;

FIGURE 2 is a phantom perspective rear view of a stack of receptacles supported on a dolly;

FIGURE 3 is a fragmentary side section of the dolly supported on the ramp of the invention taken on the line 3-3 of FIGURE 2; and FIGURE 4 is a rear elevation of the dolly substantially on the line 4-4 of FIGURE 2.

DETAILED DESCRIPTION OF THE ILLUSTRATED EMBODIMENT

As shown in FIGURE 1 of the drawing, the ramp 10 of the present invention may be placed against the rear end of a truck 12, so that it defines an inclined structure from the deck of the truck to the ground. As shown in FIGURES 1, 2 and 3, the ramp includes, for example, structure defining a first pair of inclined channels 14 and 20. The channels 14 and 20 constitute the outer and upper channels of the ramp, and they are spaced apart a predetermined distance. The ramp also includes structure defining a second pair of channels 18 and 16 which are inset with respect to the channels 14 and 20, as shown, and which are displaced down from the channels 14 and 20.

The lower inner channels 18 and 16, for example, are held in a predetermined spaced and parallel relationship by a central strip 24 which is welded, or otherwise affixed to the lower channels, or which is integral therewith. The upper outer channels 14 and 20 are supported up from the lower inner channels 18 and 16 by means, for example, of a plurality of upright supports 25 and inclined truss members 26 which are welded, or otherwise affixed to the channels.

As a result, the ramp of the invention defines a first inclined two-channel plane which is defined by the channels 14 and 20, and it also defines a second inclined two-channel plane spaced down from the first plane and parallel thereto, the second plane being defined by the inner and lower channels 18 and 16.

A stack of receptacles 30 may be loaded onto the truck 12 by placing the stack on a dolly 32 (FIGURES 2, 3, 4) for example, and by wheeling the dolly up the ramp. The dolly has a base 34, and it is supported on the inclined ramp (FIGURE 1), so that its base is in a horizontal position, in order that the receptacles of the stack 30 may be supported in a generally upright position, as shown, with the individual receptacles of the stack being disposed horizontally, as the dolly is moved up or down the inclined ramp.

It will be appreciated, therefore, that the ramp of the invention provides a convenient means for loading dolly or rack supported stacks of receptacles onto the truck 12, or for unloading the stacks from the truck, without any danger of the stacks falling over, or of the contents of the individual receptacles falling out.

As shown in FIGURES 2, 3 and 4, the dolly 32 includes a base 34. A first pair of casters 36 and 38 are mounted at the forward end of the base 34, and a second pair of casters 40 and 42 are mounted at the rear end. The casters 36 and 38 are spaced apart a greater distance than the casters 40 and 42, so that when the dolly is wheeled up or down the ramp 10 in FIGURE 1, the front casters 36 and 38 may engage the upper outer channels 14 and 20, whereas the rear casters may engage the lower inner channels 16 and 18. Then, the stack of receptacles 30 is supported in the desired upright position, as shown in FIGURE 1 as the dolly is moved up or down the ramp.

The racks mentioned previously herein are each equipped with a base having a forward pair of casters and a rear pair of casters, similar to the base 34 of the dolly of FIGURE 2. For these racks, the casters of the forward pair are likewise spaced apart a greater distance than the casters of the rear pair, so that the desired engagement between the casters and the channels of the ramp may be achieved.

The invention provides, therefore, an improved ramp which may be conveniently carried in a truck, and which is most useful in loading and unloading the particular stacks of receptacles described herein into the truck and out of the truck.

I claim:

1. A ramp for loading and unloading a stack of receptacles onto and from an elevated platform, such as a truck body, said receptacles being normally supported on a wheeled base, said ramp including: a first structure defining first inclined channel means, and a second structure defining second inclined channel means disposed down from said first channel means, said first and second inclined channel means receiving said wheeled base with a generally horizontal disposition, so that said receptacles, likewise, are individually supported in a generally horizontal position.

2. The ramp defined in Claim 1, in which said wheeled base has a pair of forward wheels and a pair of rear wheels, said first structure defines a first pair of inclined channels for receiving one of said pairs of wheels, and said second structure defines a second pair of inclined channels disposed down from said first pair of channels for receiving the other of said pairs of wheels.

3. The ramp defined in Claim 2, in which the wheels of one of said pairs are disposed apart a greater distance than the wheels of the other of said pairs, and said channels of said second pair are disposed inwardly with respect to corresponding ones of said channels of said first pair.

4. The ramp defined in Claim 2, in which said wheels of said forward pair are disposed apart a greater distance than said wheels of said rear pair, and said channels of said second pair receive the rear wheels and said channels of said first pair receive forward wheels.

5. The ramp defined in Claim 4, in which said channels of said second pair are disposed inwardly with respect to corresponding ones of said channels of said first pair.